United States Patent [19]

Müller

[11] 4,443,796
[45] Apr. 17, 1984

[54] DOPPLER RADAR

[75] Inventor: Jörg Müller, Zorneding, Fed. Rep. of Germany

[73] Assignee: Siemens Aktiengesellschaft, Berlin and Munich, Fed. Rep. of Germany

[21] Appl. No.: 262,800

[22] Filed: May 12, 1981

[30] Foreign Application Priority Data

May 23, 1980 [DE] Fed. Rep. of Germany ....... 3019887

[51] Int. Cl.³ .............................................. G01S 9/00
[52] U.S. Cl. ................... 343/5 PD; 343/8; 343/772
[58] Field of Search ............. 333/227, 233, 252, 81 B; 343/7 PF, 8, 767, 772, 786, 5 PD, 7.7

[56] References Cited

U.S. PATENT DOCUMENTS

| | | | |
|---|---|---|---|
| 2,283,935 | 5/1942 | King | 250/11 |
| 2,433,368 | 12/1947 | Johnson et al. | 250/11 |
| 2,853,687 | 9/1958 | Weber | 333/81 B |
| 3,122,740 | 2/1964 | Kruse et al. | 343/8 |
| 3,624,555 | 11/1971 | Klein | 331/107 R |
| 3,745,573 | 7/1973 | Dick | 343/7 PF |
| 3,805,262 | 4/1974 | Klein et al. | 343/5 PD |
| 4,042,934 | 8/1977 | Davis | 343/786 |

OTHER PUBLICATIONS

Article by M. W. Hosking "Microwave Intruder Alarm" from Wireless World, Jul. 1977, p. 36.

*Primary Examiner*—Maynard R. Wilbur
*Assistant Examiner*—M. R. Gordon
*Attorney, Agent, or Firm*—Herbert L. Lerner; Laurence A. Greenberg

[57] ABSTRACT

Doppler radar for measuring objects, including a first and a second substantially prismatic cavity resonator each having an end facing the object to be measured and each having substantially equal dimensions, a common wall connecting the cavity resonators to each other, an oscillator diode disposed in the first cavity resonator, a receiving diode disposed in the second cavity resonator, the end of the first cavity resonator facing the object to be measured being closed and the end of the second cavity resonator facing the object to be measured being open, and the common connecting wall having an opening formed therein.

20 Claims, 2 Drawing Figures

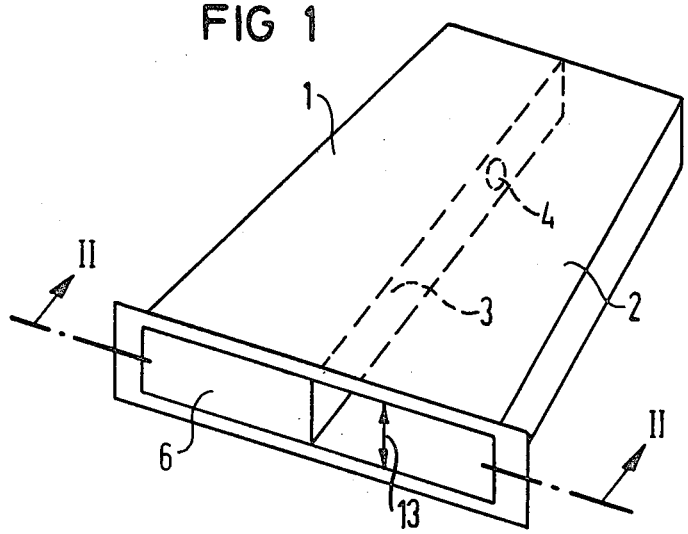
FIG 1
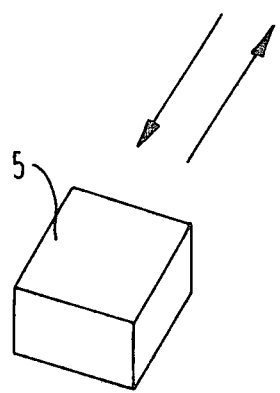
FIG 2
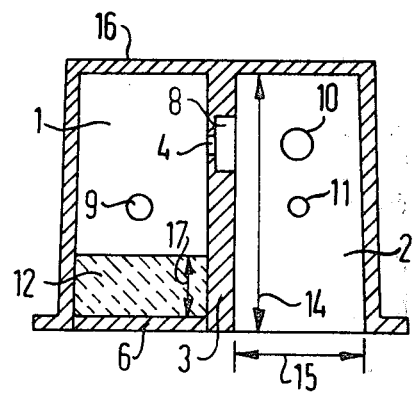

DOPPLER RADAR

The invention relates to a doppler radar, including two substantially prismatic cavity resonators having substantially the same dimensions and being connected to each other by means of a wall common to both cavity resonators, an oscillator diode being disposed in the first cavity resonator and a receiving diode being disposed in the second cavity resonator.

A corresponding doppler radar which is suitable for speed measurement or for the detection of motion is known from the article by M. W. Hosking "Microwave Intruder Alarm" from Wireless World, July 1977, Page 36 et sec. That device includes two prismatic cavity resonators which have substantially the same height, width and length, are rigidly connected to each other at one of their longitudinal sides, and have end faces aimed at the object to be measured which are open. In the first cavity resonator, a Gunn diode is provided for exciting oscillations, while a Schottky diode is provided in the second cavity resonator for frequency mixing. The waves radiated due to the open end face of the first cavity resonator are reflected by a moving object with a different frequency because of the doppler effect. By means of the Schottky diode disposed in the second cavity resonator, the doppler frequency is obtained by heterodyning the transmitting frequency with the return frequency, and is fed to further evaluation means.

It has now been found that a doppler radar constructed in this manner has relatively little sensitivity. The reason for this is, among other things, that only a very small part of the radiated transmitter power is coupled by the first cavity resonator into the second cavity resonator. In addition, the suppression of harmonics is a problem.

It is accordingly an object of the invention to provide a doppler radar which overcomes the hereinafore-mentioned disadvantages of the heretofore-known devices of this general type, and which has high sensitivity and is low in harmonics. The doppler radar should also be economical to produce for different transmitter powers.

With the foregoing and other objects in view there is provided, in accordance with the invention, a doppler radar for measuring objects, comprising a first and a second substantially prismatic cavity resonator each having an end face pointing or facing the object to be measured and each having substantially equal dimensions, a common wall connecting the cavity resonators to each other, an oscillator diode disposed in the first cavity resonator, a receiving diode disposed in the second cavity resonator, the end of the first cavity resonator facing the object to be measured being closed and the end of the second cavity resonator facing the object to be measured being open, and the common connecting wall having an opening formed therein.

With this arrangement, the waves generated in the first cavity resonator are not radiated directly in the direction of the object to be determined but are coupled through the opening made in the connecting wall into the second cavity resonator and radiated through the open end face of the second cavity resonator. Due to the high percentage of radiated power which acts on the receiving diode disposed in the second cavity resonator, its characteristic is well modulated. An output signal which is considerably larger than in the previous state of the art is obtained. Depending on the size of the opening in the connecting wall, the radiated power can be further adjusted.

To increase the power coupled into the second cavity resonator, in accordance with another object of the invention, the common connecting wall has a reduced thickness region formed therein in the vicinity of the opening.

In accordance with a further object of the invention, the reduced thickness region of the wall is between 0.3 and 1.5 mm thick.

In accordance with an added object of the invention, the common connecting wall has an additional counterbore formed therein in the vicinity of the opening having a larger cross-sectional area than the opening.

In accordance with an additional feature of the invention, to avoid undesirable harmonics, the first cavity resonator has another end face pointing away from the object opposite to the end facing the object, the opening being spaced from the other end by a distance of $(2n+1)\cdot\lambda/4$, especially $\lambda/4$, where $\lambda$ is the wavelength of oscillations excited in the first cavity resonator and n is an integral number starting from 0.

In accordance with again another feature of the invention, the opening has a diameter of between one-half of and the full height of the common connecting wall.

In accordance with again a further feature of the invention, for achieving small overall length, there is provided a dielectric insert formed of a material having a dielectric constant greater than that of air, the insert being disposed in at least the first cavity resonator.

In accordance with again an added feature of the invention, the first cavity resonator has another end opposite to the end facing the object, and the dielectric insert is approximately prismatic and has a rectangular surface corresponding in dimensions to one of the ends of the first cavity resonator.

In accordance with again an additional feature of the invention, there is provided a dielectric insert disposed in the first cavity resonator at the end thereof facing the object.

In accordance with yet another feature of the invention, the dielectric insert is formed of plastic such as polyvinyl chloride or ceramic.

In accordance with yet a further feature of the invention, there is provided a metal post prodruding over a variable length into the second cavity resonator for controlling transmitter power, particularly into the center thereof.

In accordance with yet an added feature of the invention, the second cavity resonator has another end face pointing away from the object opposite to the end facing the object, and the metal part is spaced at a distance from the other end of $\lambda/2$, where $\lambda$ is the wavelength of oscillations.

In accordance with yet an additional feature of the invention, the length of the metal post prodruding into the second cavity resonator is at most half the height of the second cavity resonator.

In accordance with still another feature of the invention, there is provided a cover being cold-welded to the first cavity resonator closing off the end thereof facing the object.

In accordance with two concomitant features of the invention, there are provided means connected to the doppler radar for forming a proximity switch or a velocity measuring device.

In other words, the doppler radar according to the invention is preferably used as a proximity switch or a speed measuring device.

Other features which are considered as characteristic for the invention are set forth in the appended claims.

Although the invention is illustrated and described herein as embodied in a doppler radar, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings, in which:

FIG. 1 is a diagrammatic perspective view of an embodiment of a doppler radar according to the invention; and FIG. 2 is a cross-sectional view taken along the line II—II in FIG. 1, in the direction of the arrows.

Referring now to the figures of the drawing and first particularly to FIG. 1 thereof, it is seen that the embodiment example shown therein includes a first cavity resonator 1, in which an oscillator diode such as a Gunn-diode is disposed. The Gunn-diode is not shown in the figure for reasons of clarity. Also included is a second cavity resonator 2 in which a receiving diode, such as a Schottky diode is located, but is likewise not shown in the figure. The cavity resonators 1 and 2 are separated by a connecting wall 3 in which an opening, such as a circular opening 4, is located. The end face of the first cavity resonator 1 which points toward the object 5 that is normally moving, is closed off, such as by means of a cover 6. The corresponding end face of the second cavity resonator 2 is open. The resonators 1 and 2 may have the same dimensions as each other and are prismatic in the example shown, the end faces pointing toward the object 5 having a somewhat larger cross-section than the opposite end faces. However, other resonator forms also suitable for generating microwaves can be used.

FIG. 2 shows a horizontal cross section through the center of the embodiment shown in FIG. 1. The same reference symbols as in FIG. 1 are used in FIG. 2. The oscillator diode 9 is disposed in the first cavity resonator 1 and the receiving diode 10 is disposed in the second cavity resonator 2. A counterbore 8 formed in the vicinity of the hole 4 in the connecting wall 3 serves for better power transmission between the two resonators. Fine control of the transmitter power is possible by means of a metal post 11. The post 11 has an axis which is perpendicular to the plane of the drawing of FIG. 2 and it is disposed in the second cavity resonator 2 in such a manner that its length projecting into the resonator 2 is variable. The metal post 11 can be constructed as a screw, for instance.

The overall length of the doppler radar can be shortened by means of a dielectric insert 12. The material suitable for the insert 12 may be any dielectric material with a dielectric constant larger than that of air, for instance plastics such as polyvinyl chloride. By using dielectric inserts 12 of different dielectric constants and/or different mechanical length, the cavity resonator 1 can be operated at different frequencies in a simple way and without great effort for changing. If a first cavity resonator 1 is used which is closed according to the invention, the dielectric insert 12 can be exchanged in a simple manner by opening the cover 6. It is particularly advantageous to choose the dielectric insert so that a temperature-related frequency change of the resonator 1 is compensated, i.e. so that the electric length of the insert 12 is shortened in the event of temperature changes in the same manner as the electric length of the resonator is increased. A suitable ceramic material is $(Zr_x Ti_y Sn_z) O_4$ for example, where the sum of the three subscripts x, y and z is two.

The radiated power of the doppler radar can be roughly set by the choice of the diameter of the opening 4. Thus, the radiated power is 20 dB smaller for a hole diameter which corresponds to one-half of the height 13 of the connecting wall 3, than if an opening 4 is used having a cross section which corresponds to the entire height 13 of the connecting wall 3. The transmitted power can be increased by reducing the wall thickness of the connecting wall 3. For reasons of mechanical strength, however, it is advisable to merely form a counterbore 8 for this purpose in the vicinity of the opening 4, with a diameter which is larger than the diameter of the opening 4 and, in particular, corresponds to the entire height 13 of the connecting wall 3.

The dimensions of the resonators 1 and 2 are customarily chosen in such a way that the wall length 14 of the resonators corresponds approximately to the wave length $\lambda$ of the oscillation to be generated; that the width 15 of a resonator end face is in the range between $\lambda/2$ and $\lambda$; and that the height 13 of the resonators is in the range between $\lambda/4$ and $\lambda/2$. In principle, the resonator length 14 is $n.\lambda/2$ for integral numbers n. The oscillator diode 9 is preferably disposed in the center of the first cavity resonator 1.

To avoid interfering harmonics which must be suppressed, for instance due to Post Office regulations, it is advisable to locate the opening 4 at a distance of $(2n+1)\lambda/4$ and in particular $\lambda/4$, from the rear wall 16 of the first cavity resonator 1. The distance between the receiving diode 10 and the rear wall of the second cavity resonator 2 should be chosen correspondingly, and particularly should likewise be $\lambda/4$. The metal post 11 serving for fine control of the transmitter power can be disposed in the center of the second cavity resonator 2, i.e. at a distance of $\lambda/2$ from the rear wall, for instance. The transmitted power can be lowered, for instance, by 15 to 20 dB as compared to the maximum power, with a screw which can be turned up to one-half the height 13 of the resonator 2 into the resonator 2. Through the construction of the doppler radar according to the invention, its power can be adjusted without using absorption materials. The receiving diode 10 receives a considerably larger share of the transmitted power if the first resonator is closed and the connecting wall 3 is provided with an opening 4. As compared to the arrangement known from the state of the art without an opening 4 and with the first cavity resonator open. The sensitivity of the doppler radar is therefore considerably improved. Furthermore, the required opening area of the doppler radar is reduced by one-half in spite of the high sensitivity, which is a great advantage for numerous applications. For the doppler radar according to the invention, cavity resonators which oscillate in the range between 1 and 200 GHz can be used where an avalanche propagation-time diode (IMPATT diode) is advantageously used as the transmitting diode instead of a Gunn diode for very high frequencies. For reasons of compliance with Post Office or other regulations, a corresponding doppler radar is normally operated in the frequency range between 9.3 to 10.7 GHz. The radar can be used for detecting any moving objects, such as people, and can therefore be used as a burglar alarm or proximity switch. Use as a speed measuring device, such as for measuring the velocity of vehicles, is also possible.

An example of the dimensions and specifications of the device is as follows:

Dimensions of the cavity resonators 1 and 2:
Length 14: 42.5 mm
Width 15 (front side): 21 mm
Height 13 (front side): 10.3 mm
Diameter of the opening 4 = the wall height 13: 10.3 mm
Operating frequency: 9.35 GHz
Radiated power: 25 mW With a diameter of the opening 4 which corresponds to one-half of the height 13 of the connecting wall 3, irradiated power is in the order of magnitude of 1 mW.

A commercial available Gunn-diode supplied with a stabilized voltage of 8 volts, is used as the oscillator diode. The signal of the Schottky diode used as the receiving diode 10 is amplified by 60 dB by means of a three-stage, low-noise amplifier and is subsequently evaluated.

If a dielectric insert 12 of the formula $(Zr_{0.5} Ti Sn_{0.5})O_4$ with a length 17 of 2 mm is used, the overall length 14 of the doppler radar can be shortened from 42.5 mm to 36.5 mm for the same operating frequency. The temperature drift of the operating frequency can also be simultaneously reduced considerably. With wall thicknesses in the order of 3 mm the counterbore 8 can be made so that the remaining wall thickness is 0.5 to 1.5 mm.

There is claimed:

1. Doppler radar for measuring objects, comprising a first and a second substantially prismatic cavity resonator each having sides, each having an end facing the object to be measured and each having substantially equal dimensions, a common wall connecting a respective side of each of said cavity resonators to each other, an oscillator diode disposed in said first cavity resonator, a receiving diode disposed in said second cavity resonator, said end of said first cavity resonator facing the object to be measured being closed and said end of said second cavity resonator facing the object to be measured being open, said common connecting wall having an opening formed therein, said first cavity resonator having another end opposite to said end facing the object, and said opening being spaced from said other end by a distance of $(2n+1)\cdot\lambda/4$, where $\lambda$ is the wavelength of oscillations excited in said first cavity resonator and n is an integral number starting from 0.

2. Doppler radar according to claim 1, wherein said common connecting wall has a reduced thickness region formed therein in the vicinity of said opening.

3. Doppler radar according to claim 2, wherein said reduced thickness region of said wall is between 0.3 and 1.5 mm thick.

4. Doppler radar according to claim 1, wherein said common connecting wall has an additional counterbore formed therein in the vicinity of said opening having a larger cross-sectional area than said opening.

5. Doppler radar for measuring objects, comprising a first and a second substantially prismatic cavity resonator each having sides, each having an end facing the object to be measured and each having substantially equal dimensions, a common wall connecting a respective side of each of said cavity resonators to each other, an oscillator diode disposed in said first cavity resonator, a receiving diode disposed in said second cavity resonator, said end of said first cavity resonator facing the object to be measured being closed and said end of said second cavity resonator facing the object to be measured being open, said common connecting wall having an opening formed therein, said first cavity resonator having another end opposite to said end facing the object, and said opening being spaced from said other end by a distance of $\lambda/4$, where $\lambda$ is the wavelength of oscillations excited in said first cavity resonator and n is an integral number starting from 0.

6. Doppler radar according to claim 1, wherein said opening has a diameter of between one-half of and the full height of said common connecting wall.

7. Doppler radar according to claim 1, including a dielectric insert formed of a material having a dielectric constant greater than that of air, said insert being disposed in at least said first cavity resonator.

8. Doppler radar according to claim 7, wherein said first cavity resonator has another end opposite to said end facing the object, and said dielectric insert is approximately prismatic and has a rectangular surface corresponding in dimensions to one of said ends of said first cavity resonator.

9. Doppler radar according to claim 1, including a dielectric insert disposed in said first cavity resonator at said end thereof facing the object.

10. Doppler radar according to claim 7, 8 or 9, wherein said dielectric insert is formed of plastic.

11. Doppler radar according to claim 7, 8 or 9, wherein said dielectric insert is formed of polyvinyl chloride.

12. Doppler radar according to claim 7, 8 or 9, wherein said dielectric insert is formed of ceramic.

13. Doppler radar for measuring objects, comprising a first and a second substantially prismatic cavity resonator each having sides, each having an end facing the object to be measured and each having substantially equal dimensions, a common wall connecting a respective side of each of said cavity resonators to each other, an oscillator diode disposed in said first cavity resonator, a receiving diode disposed in said second cavity resonator, said end of said first cavity resonator facing the object to be measured being closed and said end of said second cavity resonator facing the object to be measured being open, said common connecting wall having an opening formed therein, and a metal post protruding over a variable length into said second cavity resonator for controlling transmitter power.

14. Doppler radar according to claim 3, wherein said metal post protrudes into the center of said second cavity resonator.

15. Doppler radar according to claim 13, wherein said second cavity resonator has another end opposite to said end facing the object, and said metal post is spaced at a distance from said other end of $\lambda/2$, where $\lambda$ is the wavelength of oscillations.

16. Doppler radar according to claim 13, wherein said length of said metal post protruding into said second cavity resonator is at most half the height of said second cavity resonator.

17. Doppler radar according to claim 1, including a cover being cold-welded to said first cavity resonator closing off said end thereof facing the object.

18. Doppler radar according to claim 1, including means connected to the doppler radar for forming a proximity switch.

19. Doppler radar according to claim 1, including means connected to the doppler radar for forming a velocity measuring device.

20. Doppler radar according to claim 1, 2 or 3, wherein said second cavity resonator has a further end opposite to said end facing the object, and said receiving diode and opening are spaced from said further end by the same distance.

* * * * *